US008161491B2

(12) United States Patent
Krishnakumar et al.

(10) Patent No.: US 8,161,491 B2
(45) Date of Patent: Apr. 17, 2012

(54) SOFT REAL-TIME LOAD BALANCER

(75) Inventors: Anjur Sundaresan Krishnakumar, Princeton, NJ (US); Parameshwaran Krishnan, Basking Ridge, NJ (US); Min Lee, Atlanta, GA (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 85 days.

(21) Appl. No.: 12/768,458

(22) Filed: Apr. 27, 2010

(65) Prior Publication Data

US 2011/0035751 A1 Feb. 10, 2011

Related U.S. Application Data

(60) Provisional application No. 61/232,542, filed on Aug. 10, 2009, provisional application No. 61/254,019, filed on Oct. 22, 2009.

(51) Int. Cl.
*G06F 9/455* (2006.01)
*G06F 9/46* (2006.01)
*G06F 15/173* (2006.01)

(52) U.S. Cl. ............ 718/105; 718/1; 718/103; 709/223; 709/224; 709/226

(58) Field of Classification Search .................. 718/103, 718/105
See application file for complete search history.

(56) References Cited

U.S. PATENT DOCUMENTS

| | | | | |
|---|---|---|---|---|
| 5,392,430 A | * | 2/1995 | Chen et al. ..................... | 718/102 |
| 5,701,482 A | * | 12/1997 | Harrison et al. .............. | 718/105 |
| 6,658,449 B1 | * | 12/2003 | Brenner et al. ................ | 718/105 |
| 6,687,257 B1 | * | 2/2004 | Balasubramanian .......... | 370/429 |
| 6,779,182 B1 | * | 8/2004 | Zolnowsky .................... | 718/103 |

(Continued)

FOREIGN PATENT DOCUMENTS

EP 1536335 * 6/2005

OTHER PUBLICATIONS

Tannenbatum et al. "Condor—A Distributed Job Scheduler", ACM, 2001, p. 1-44.*

(Continued)

*Primary Examiner* — Jennifer To
(74) *Attorney, Agent, or Firm* — Maldjian Law Group LLC; John P. Maldjian, Esq.; Alexander D. Walter, Esq.

(57) ABSTRACT

The present disclosure is based on a multi-core or multi-processor virtualized environment that comprises both time-sensitive and non-time-sensitive tasks. The present disclosure describes techniques that use a plurality of criteria to choose a processing resource that is to execute tasks. The present disclosure further describes techniques to re-schedule queued tasks from one processing resource to another processing resource, based on a number of criteria. Through load balancing techniques, the present invention both (i) favors the processing of soft real-time tasks arising from media servers and applications, and (ii) prevents "starvation" of the non-real-time general computing applications that co-exist with the media applications in a virtualized environment. These techniques, in the aggregate, favor the processing of soft real-time tasks while also reserving resources for non-real-time tasks. These techniques manage multiple processing resources to balance the competing demands of soft real-time tasks and of non-real-time tasks.

13 Claims, 11 Drawing Sheets

U.S. PATENT DOCUMENTS

| | | | |
|---|---|---|---|
| 6,779,183 B1* | 8/2004 | Chekuri et al. | 718/105 |
| 6,795,927 B1 | 9/2004 | Altmejd et al. | |
| 6,985,951 B2 | 1/2006 | Kubala et al. | |
| 7,035,984 B2 | 4/2006 | Mastronarde et al. | |
| 7,065,766 B2* | 6/2006 | Brenner | 718/103 |
| 7,140,020 B2 | 11/2006 | McCarthy et al. | |
| 7,437,728 B2 | 10/2008 | Stackhouse et al. | |
| 7,673,113 B2 | 3/2010 | Sugumar et al. | |
| 7,743,140 B2 | 6/2010 | Arnt et al. | |
| 7,793,294 B2* | 9/2010 | Haeri | 718/102 |
| 7,797,699 B2* | 9/2010 | Kagi et al. | 718/1 |
| 7,904,673 B2 | 3/2011 | Riska et al. | |
| 7,904,691 B2 | 3/2011 | Branda et al. | |
| 7,979,863 B2 | 7/2011 | Esfahany et al. | |
| 2003/0110203 A1* | 6/2003 | Brenner et al. | 709/103 |
| 2003/0110204 A1* | 6/2003 | Brenner et al. | 709/103 |
| 2003/0191794 A1* | 10/2003 | Brenner et al. | 709/103 |
| 2003/0195920 A1* | 10/2003 | Brenner et al. | 709/107 |
| 2003/0236815 A1* | 12/2003 | Brenner et al. | 709/104 |
| 2004/0054999 A1* | 3/2004 | Willen et al. | 718/103 |
| 2004/0148390 A1 | 7/2004 | Cleary et al. | |
| 2005/0028160 A1* | 2/2005 | Cofer et al. | 718/100 |
| 2005/0091399 A1 | 4/2005 | Candan et al. | |
| 2006/0195845 A1* | 8/2006 | Rhine | 718/102 |
| 2007/0283176 A1 | 12/2007 | Tobias et al. | |
| 2008/0022284 A1 | 1/2008 | Cherkasova et al. | |
| 2008/0022288 A1* | 1/2008 | Bekooij | 718/107 |
| 2008/0059968 A1* | 3/2008 | Cascaval et al. | 718/103 |
| 2008/0134185 A1 | 6/2008 | Fedorova | |
| 2008/0141048 A1 | 6/2008 | Palmer et al. | |
| 2008/0320122 A1 | 12/2008 | Houlihan et al. | |
| 2009/0031317 A1* | 1/2009 | Gopalan et al. | 718/103 |
| 2009/0077257 A1 | 3/2009 | Savoor et al. | |
| 2010/0100877 A1* | 4/2010 | Greene et al. | 718/1 |
| 2010/0125851 A1* | 5/2010 | Singh et al. | 718/104 |
| 2010/0131955 A1* | 5/2010 | Brent et al. | 718/103 |

OTHER PUBLICATIONS

"Bin packing problem", "Wikipedia http://www.wikipedia.org/wiki/Bin_packing_problem", May 31, 2010, Publisher: Wikimedia Foundation, Inc.

Xen.Org, "Credit-Based CPU Scheduler", "Xen Wiki http://www.wiki.xensource.com/xenwiki/CreditScheduler Jun. 23, 2010", Nov. 15, 2007, Publisher: Citrix Systems, Inc.

"How Does Xen Work", "http://www.xen.org/files/Marketing/HowDoesXenWork.pdf Jun. 23, 2010", Dec. 2009.

"How to Enable Xentrace Logging and Format With Xentrace_Format", "Citrix Knowledge Center CTX121583 http://support.citrix.com/article/CTX121583", , Publisher: Citrix Systems, Inc.

Gupta et al, "XenMon: QoS Monitoring and Performance Profiling Tool", "Technical Report HPL-2005-187", Oct. 18, 2005, Publisher: Hewlett-Packard Development Company, LP.

U.S. Appl. No. 12/686,719, filed Jan. 13, 2010.

Santos et al., "Bridging the Gap between Software and Hardware Techniques for I/O Virtualization", "2008 USENIX Annual Technical Conference http:www.usenix.org/events/usenix08/tech/ful_papers/santos/santos.pdf", , Publisher: USENIX Association.

Apparao et al., "Characterization & Analysis of a Server Consolidation Benchmark", "Virtual Execution Environments Conference 2008 Seattle, Washington", Mar. 5-7, 2008, Publisher: Association for Computing Machinery.

Apparao et al., "Characterization of network processing overheads in Xen", "Second Annual Workshop on Virtualization Technology in Distributed Computing (VTDC 2006)", 2006, Publisher: IEEE.

Willmann et al., "Concurrent Direct Network Access for Virtual Machine Monitors", "HPCA 2007".

Menon et al., "Diagnosing Performance Overheads in the Xen Virtual Machine Environment", "http://www.hpl.hp.com/techreports/2005/HPL-2005-80.pdf", 2005, Publisher: Association for Computing Machinery.

Nishiguchi, Naoki, "Evaluation and consideration of credit scheduler for client virtualization", "http://www.xen.org/files/xensummit_tokyo/15/NaokiNishiguchi-en.pdf Other info at http:www.xen.org/xensummit/xensummit_fall_2008. html", 2008, Publisher: Fujitsu Laboratories Limited.

Liu et al., "High Performance VMM-Bypass I/O in Virtual Machines", "Annual Tech '06: 2006 USENIX Annual Technical Conference http://www.usenix.org/events/usenix06/tech/full_papers/liu/liu.pdf", , Publisher: USENIX Association.

Raj et al., "High Performance and Scalable I/O Virtualization via Self-Virtualized Devices", "IEEE International Symposium on High Performance Distributed Computing (HPDC) 2007 Monterrey, California", Jun. 25-29, 2007, Publisher: Association for Computing Machinery.

"P.862 Perceptual evaluation of speech quality (PESQ): An objective method for end-to-end speech quality assessment of", 2008, Publisher: International Telecommunication Union (ITU).

"Series P: Telephone Transmission Quality, Telephone Installations, Local Line Networks ", "ITU-T Recommendation P.862", Feb. 2001.

Menon et al., "Optimizing Network Virtualization in Xen", "http://www.usenix.org/events/usenix06/tech/menon/menon_html/paper.html", http://infoscience.epfl.ch/getfile.py?docid=8044&name=usenix06&format=pdf&version=1, 2006.

Menon et al., "Optimizing Network Virtualization in Xen", (Alternative Source).

Zhang et al., "Optimizing Xen VMM Based on Intel Virtualizatio Technology", "2008 International Conference on Internet Computing in Science and Engineering", 2008, Publisher: IEEE Xplore.

Oi et al., "Performance Analysis of Large Receive Offload in a Xen Virtualized System", "2009 International Conference on Computer Engineering and Technology", 2009, Publisher: IEEE Xplore.

Patnaik et al., "Performance Implications of Hosting Enterprise Telephony Application on Virtualized Multi-Core Platforms", "IPTCOMM 2009 Conference Georgia Tech Atlanta, Georgia", Jul. 7-8, 2009, Publisher: Association for Computing Machinery, Published in: US.

Ongaro et al., "Scheduling I/O in Virtual Machine Monitors", "Virtual Execution Environments 2008 Seattle, Washington", Mar. 5-7, 2008, Publisher: Associaton for Computing Machinery.

Calandrino et al., "Soft Real-Time Scheduling on Performance Asymmetric Multicore Platforms".

Liao et al, "Software Techniques to Improve Virtualized I/O Performance on Multi-Core Systems", "ACM/IEEE Symposium on Architectures for Networking and Communications Systems (ANCS) 2008 San Jose, California", Nov. 6-7, 2008, Publisher: Association for Computing Machinery.

Yoo et al., "A Step to Support Real-time in Virtual Machine", "http://os.korea.ac.kr/publication_papers/inter_confer/shyoo_CCNC_2009.pdf", 2009, Publisher: IEEE Xplore.

Thibault, Samuel, "Stub Domains—A Step Towards Dom0 Disaggregation", "http://www.xen.org/files/ xensummitboston08/SamThibault_XenSummit.pdf", , Publisher: Xen Summit.

Kim et al., "Task-aware Virtual Machine Scheduling for I/O Performance", "Virtual Execution Environments 2009 Washington, DC", Mar. 11-13, 2009, Publisher: Association for Computing Machinery.

Barham et al., "Xen and the Art of Virtualization", "Symposium on Operating System Principles 2003 Bolton Landing, New York http://www.cl.cam.ac.uk/research/srg/netos/papers/2003-xensosp.pdf", Oct. 19-22, 2003, Publisher: Association for Computing Machinery, Published in: US.

Govindan et al., "Xen and Co.: Communication-aware CPU Scheduling for Consolidated Xen-based Hosting Platforms", "Virtual Execution Environments 2007 San Diego, California", Jun. 13-15, 2007, Publisher: Association for Computing Machinery.

Ackaouy, Emmanuel, "[Xen-devel] New CPU scheduler w/ SMP load balancer", "http://lists.xensource.com/archives/html/xen-devel/2006-05/msg01315.html", May 36, 2006, Publisher: xensource.com.

Mathai,Jacob, "Xen Wiki—Xen Scheduling", "http://wiki.xensource.com/xenwiki/Scheduling[Nov. 23, 2009 11:44:24 AM]", Jun. 9, 2007.

"Xen Summit Asia 2008", "http://www.xen.org/xensummit/xensummit_fall_2008.html[Nov. 23, 2009 11:23:18 AM]", Nov. 20-21, 2008, Publisher: xen.org.

Malkevitch, Joseph, "Bin Packing, Feature Column Archive, American Mathematical Society" "http://www.ams.org/featurecolumn/archive/bins1.html[Apr. 27, 2010]".

Xen Credit-Based CPU Scheduler, http://wiki.xensource.com/xenwiki/CreditScheduler[Apr. 27, 2010].

Xen Hypervisor—leading Open Source Hypervisor for Servers, http://www.xen.org/products/xenhyp.html[Apr. 27, 2010].

Lee et al, Supporting Soft real-Time tasks in the Xen Hypervisor, VEE'10.

Malkevitch, Joseph, "Bin Packing and Machine Scheduling, Feature Column Archive, American Mathematical Society, "https://www.ams/org/samplings/feature-column/fcarc-packings1[Apr. 27, 2010].

Wikipedia online, Multiprocessor Scheduling, http://en.wikipedia.org/wiki/Multiprocessor_scheduling[Apr. 27, 2010].

Kim et al. "Guest-Aware Priority-Based Virtual Machine Scheduling for Highly Consolidated Server," 2008, pp. 285-294.

\* cited by examiner

SOFT REAL-TIME LOAD BALANCER

CROSS REFERENCE TO RELATED APPLICATIONS

This application claims the benefit of U.S. provisional application number 61/232,542, filed Aug. 10, 2009, entitled "Supporting Soft Real-Time Virtual Machines.". The concepts, but not necessarily the nomenclature, of this provisional application are hereby incorporated by reference.

Furthermore, this application claims the benefit of U.S. provisional application number 61/254,019, filed Oct. 22, 2009, entitled "Supporting Soft Real-Time Virtual Machines". The concepts, but not necessarily the nomenclature, of this provisional application are hereby incorporated by reference.

U.S. patent application Ser. No. 12/686,719, filed Jan. 13, 2010, entitled "Credit Scheduler for Ordering the Execution of Tasks," is related and is hereby incorporated by reference.

If there are any contradictions or inconsistencies between this application and one or more of the cases that have been incorporated by reference, the claims in the present case should be interpreted to be consistent with the language in this case.

FIELD OF THE INVENTION

The present invention relates to data processing systems in general, and, more particularly, to credit schedulers for ordering the execution of tasks on a processor.

BACKGROUND OF THE INVENTION

When two or more operating systems operate on one piece of hardware, the tasks associated with each operating system contend for the hardware that is available. Without something to mediate their access, one operating system's tasks could monopolize or over-use the hardware to the detriment of the other operating system's tasks. When the hardware comprises more than one processor that is available to execute the various tasks, one processor can become over-utilized while another remains under-used. Therefore, a program sits between the operating systems and the hardware to act as a mediator. This program is commonly known as a "hypervisor."

One of the jobs performed by the hypervisor is to choose a processor that is to execute one or more tasks. Another job of the hypervisor is scheduling the order of execution of tasks. These are not easy jobs. Some tasks are time-sensitive (e.g., tasks associated with input or output, speech processing, video processing, transmission or reception of signals, etc.) and some tasks are non-time-sensitive or are less-time-sensitive. Whatever the mix of time-sensitive and non-time-sensitive tasks, the respective operating systems are always presenting to the hypervisor tasks to be performed, and if the hypervisor does not wisely choose the processor to execute the tasks or the order for executing those tasks, the performance of the entire system can be degraded.

The portion of a hypervisor that chooses the hardware and determines the order for executing the tasks is called a "scheduler." Schedulers in the prior art, however, do not always choose wisely, and, therefore, the need exists for an improved scheduler.

SUMMARY OF THE INVENTION

The present invention enables the scheduling and execution of tasks on a plurality of processors without some of the costs and disadvantages associated with schedulers in the prior art. Tasks generally known in the art as "soft real-time" tasks are time-sensitive tasks that have somewhat flexible (or "soft") deadlines. Tasks that perform general computing typically are non-time-sensitive tasks. The present invention serves the special needs of soft real-time tasks, and therefore, whether a task is time-sensitive or non-time-sensitive, is material to the operation of the illustrative embodiments disclosed herein.

Prior art schedulers that manage multi-processor or multi-core computing have been challenged by soft real-time tasks, such as those in media servers and IP PBX applications. This results in poor quality of voice, image, or video. To avoid impairing voice, image, or video quality, prior art schedulers traditionally dedicate physical processing resources to soft real-time applications or else "starve" the non-real-time tasks of processing resources by favoring the soft real-time tasks. These solutions often cost more and generally produce degraded overall performance.

The present invention addresses these challenges. Through load balancing techniques, the present invention both (i) favors the processing of soft real-time tasks arising from media servers and applications, and (ii) reduces "starvation" of non-real-time general computing applications that co-exist with the media applications in a multi-processor environment.

The present disclosure in accordance with the illustrative embodiments describes load balancing techniques that apply to a multi-processor virtualization environment. These techniques, in the aggregate, favor the processing of soft real-time tasks while also reserving resources for non-real-time tasks. These techniques manage multiple processing resources to balance the competing demands of soft real-time tasks and of non-real-time tasks. The techniques use a plurality of criteria to choose a processor that is to execute tasks or particular groups of tasks. The present disclosure further describes techniques to re-schedule queued tasks from one processor to another processor, based on a number of criteria.

Some illustrative embodiments comprise: scheduling by a data-processing system a first task to be executed on a first processor, wherein the first task is at the head of a first queue that comprises a plurality of tasks to be executed on the first processor; scheduling by the data-processing system a second task to be executed on a second processor, wherein the second task is at the head of a second queue that comprises a plurality of tasks to be executed on the second processor; and executing the second task on the first processor before the first task when: (i) the first task and the second task are of equal priority, and (ii) the first task is a non-time-sensitive task, and (iii) the second task is a time-sensitive task.

DETAILED DESCRIPTION

For the purposes of this specification, the term "processor" is defined as a tangible computing resource that is capable of executing a task.

For the purposes of this specification, the term "task" is defined as at least one operation performed by a processor.

A first and a second illustrative embodiment are distinguished in regards to FIGS. 3A and 3B, 7A and 7B, 8A and 8B, respectively. In broad terms, the first illustrative embodiment is directed at re-scheduling the tasks that are next to be executed by each processor in the system, i.e., the tasks at the head of each queue; subject to the disclosed criteria, either time-sensitive or non-time-sensitive tasks can be re-scheduled. In broad terms, the second illustrative embodiment is directed at periodically (i) scheduling or re-scheduling tasks to a choice of queues for the respective processors in the system and (ii) re-scheduling of non-time-sensitive tasks that are next to be executed by a processor, i.e., the non-time-sensitive tasks at the head of each queue.

In general, the methods according to the illustrative embodiments are triggered when a scheduler-related event happens in data-processing system 100, i.e., an event requiring the scheduler to act. Examples of scheduler-related events are the arrival of a new task, the occurrence of an input/output ("I/O") event for an existing task, a task relinquishing a processor, a processor becoming idle and available to execute another task, or a time-based trigger. It will be clear to those having ordinary skill in the art, after reading the present disclosure, how to make and use alternative embodiments in which the disclosed techniques are triggered by other criteria and considerations.

Figure 1:
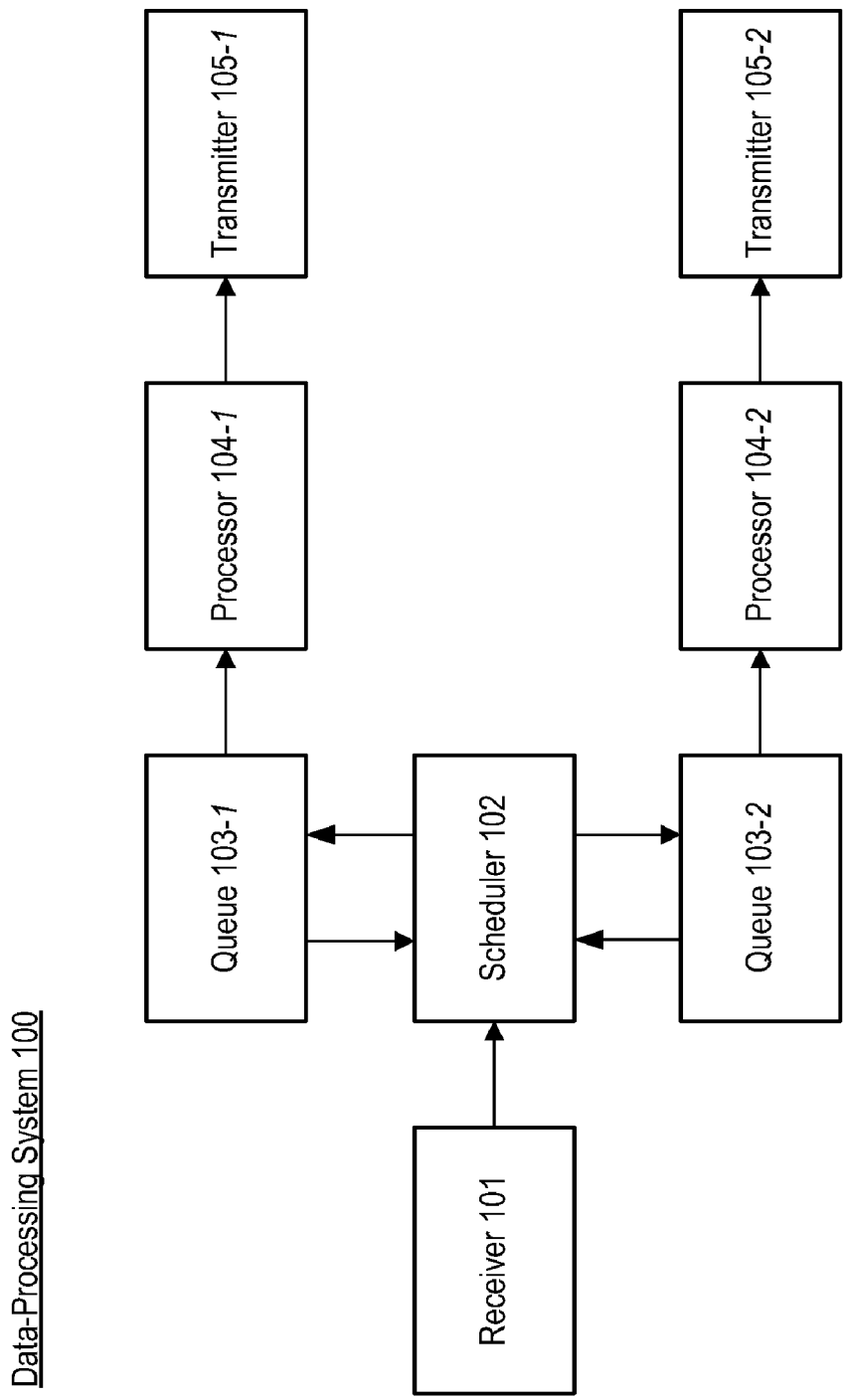
FIG. 1 depicts a schematic diagram of the salient portions of data-processing system 100 according to the illustrative embodiments of the present invention.

FIG. 1 depicts a schematic diagram of the salient portions of data-processing system 100 according to the illustrative embodiments of the present invention. Data-processing system 100 is an apparatus that comprises: receiver 101; scheduler 102; queues 103-1 and 103-2; processors 104-1 and 104-2; and transmitters 105-1 and 105-2.

Although the illustrative embodiments comprise one receiver 101, it will be clear to those having ordinary skill in the art, after reading the present disclosure, how to make and use alternative embodiments of the present invention that comprise any number of receivers, e.g., two receivers, three receivers, etc. For example, a receiver might be dedicated to each queue.

Although the illustrative embodiments comprise one scheduler 102, it will be clear to those having ordinary skill in the art, after reading the present disclosure, how to make and use alternative embodiments of the present invention that comprise any number of schedulers, e.g., two schedulers, three schedulers, etc.

Although the illustrative embodiments comprise two queues 103-1 and 103-2, it will be clear to those having ordinary skill in the art, after reading the present disclosure, how to make and use alternative embodiments of the present invention that comprise any number of queues, e.g., three queues, four queues, etc.

Although the illustrative embodiments comprise two processors 104-1 and 104-2, it will be clear to those having ordinary skill in the art, after reading the present disclosure, how to make and use alternative embodiments of the present invention that comprise any number of processors, e.g., three processors, four processors, etc. It will be further clear to those having ordinary skill in the art, after reading the present disclosure, how to make and use alternative embodiments of the present invention in which a multi-core processor platform comprises some or all of the processors. It will be further clear to those having ordinary skill in the art, after reading the present disclosure, how to make and use alternative embodiments of the present invention in which a processor comprises multiple cores.

Although the illustrative embodiments comprise two transmitters 105-1 and 105-2, it will be clear to those having ordinary skill in the art, after reading the present disclosure, how to make and use alternative embodiments of the present invention that comprise any number of transmitters, e.g., one transmitter, three transmitters, etc.

Although the illustrative embodiments depict the components of data-processing system 100 as being connected to each other as in FIG. 1, it will be clear to those having ordinary skill in the art, after reading the present disclosure, how to make and use alternative embodiments of the present invention in which the components are differently connected. For example, each queue might receive tasks from a receiver before task scheduling occurs at scheduler 102.

Although the illustrative embodiments depict the components of data-processing system 100 as being separate from one another as depicted in FIG. 1, it will be clear to those having ordinary skill in the art, after reading the present disclosure, how to make and use alternative embodiments of the present invention in which a single physical device comprises one or more of these components. For example, a multi-core processor platform could comprise: some or all of the processors; some or all of the queues; some or all of the receivers; some or all of the transmitters in data-processing system 100. Furthermore, it will be clear to those having ordinary skill in the art, after reading the present disclosure, how to make and use alternative embodiments of the present invention in which multiple physical devices are logically associated to comprise one or more of these components. For example, multiple processors that are distinct physical components could be logically associated in a virtualized computing environment. Likewise, a virtualized computing environment could comprise a combination of distinct and combined components in accordance with the present invention, such as a single-core processor and a multi-core processor.

Although the illustrative embodiments present certain ratios of one type of component to another type of component as depicted in FIG. 1, it will be clear to those having ordinary skill in the art, after reading the present disclosure, how to make and use alternative embodiments of the present invention in which the ratios differ. For example, a single queue could be logically subdivided to serve more than one processor. For example, a single transmitter might transmit output from more than one processor.

Receiver 101 is hardware that receives a temporal succession of tasks to be executed by processor 104-1 or processor 104-2 and provides those tasks to scheduler 102. It will be clear to those having ordinary skill in the art, after reading the present disclosure, how to make and use alternative embodiments of the present invention in which receiver 101 is software or a combination of software and hardware.

For purposes of the present disclosure, each task is identified by $T_i$, wherein i is an integer that represents the relative order of arrival of the task at receiver 101 with respect to other tasks. For example, task $T_i$ arrived at receiver 101 immediately before task $T_{i+1}$, wherein i is an integer. It will be clear to those skilled in the art, after reading this disclosure, how to make and use receiver 101.

Scheduler 102 is hardware and software that is capable of performing the functionality described in this disclosure and in the accompanying figures. It will be clear to those having ordinary skill in the art, after reading the present disclosure, how to make and use alternative embodiments of the present invention in which scheduler 102 is exclusively hardware or exclusively software. It will be further clear to those having ordinary skill in the art, after reading the present disclosure, that a software-based scheduler 102 is itself executed by a processor.

In accordance with the illustrative embodiments, scheduler 102 is a "credit" scheduler, but it will be clear to those skilled in the art, after reading this disclosure, how to make and use alternative embodiments of the present invention in which scheduler 102 is not a "credit" scheduler. The XEN® hypervisor is an example of a hypervisor that comprises a credit scheduler. Furthermore, it will be clear to those skilled in the art that alternative well-known names for a hypervisor include, but are not limited to, a "virtual machine monitor" or "VMM." It will be clear to those skilled in the art, after reading this disclosure, how to make and use scheduler 102.

Queue 103-1 is hardware that holds each task and its accompanying parameters, while the task awaits execution by processor 104-1. It will be clear to those having ordinary skill in the art, after reading the present disclosure, how to make and use alternative embodiments of the present invention in which queue 103-1 is software or a combination of software and hardware.

Queue 103-2 is hardware that holds each task and its accompanying parameters, while the task awaits execution by processor 104-2. It will be clear to those having ordinary skill in the art, after reading the present disclosure, how to make and use alternative embodiments of the present invention in which queue 103-2 is software or a combination of software and hardware. It will be clear to those skilled in the art, after reading this disclosure, how to make and use queue 103-1 and queue 103-2.

Processor 104-1 is hardware that is a processor that executes tasks in the order determined by scheduler 102. It will be clear to those having ordinary skill in the art, after reading the present disclosure, how to make and use alternative embodiments of the present invention in which processor 104-1 is a combination of software and hardware. In accordance with the illustrative embodiments of the present invention, processor 104-1 comprises one core, but it will be clear to those skilled in the art, after reading this disclosure, how to make and use alternative embodiments of the present invention in which processor 104-1 comprises multiple cores. Furthermore, it will be clear to those skilled in the art that alternative names for a processor include, but are not limited to, "core," "computing core," "processing core," "central processing unit," "CPU," "computing resource," or "processing resource."

Processor 104-2 is hardware that executes tasks in the order determined by scheduler 102. In the illustrative embodiments, processor 104-2 is a processor identical to processor 104-1, but it will be clear to those having ordinary skill in the art, after reading the present disclosure, how to make and use alternative embodiments in which processor 104-1 and 104-2 are not identical.

In the illustrative embodiments, processor 104-1 selects the task at the head of queue 103-1 to execute next. In the illustrative embodiments, processor 104-2 selects the task at the head of queue 103-2 to execute next. It will be clear to those having ordinary skill in the art, after reading the present disclosure, how to make and use alternative embodiments in which a processor executes its next task from a source other than its corresponding queue. It will be clear to those skilled in the art how to make and use processor 104-1 and processor 104-2.

Transmitter 105-1 is hardware that transmits the results of each task execution from processor 104-1. It will be clear to those having ordinary skill in the art, after reading the present disclosure, how to make and use alternative embodiments in which transmitter 105-1 is software or a combination of software and hardware.

Transmitter 105-2 is hardware that transmits the results of each task execution from processor 104-2. It will be clear to those having ordinary skill in the art, after reading the present disclosure, how to make and use alternative embodiments in which transmitter 105-2 is software or a combination of software and hardware. It will be clear to those having ordinary skill in the art, after reading this disclosure, how to make and use transmitter 105-1 and transmitter 105-2.

Figure 2:
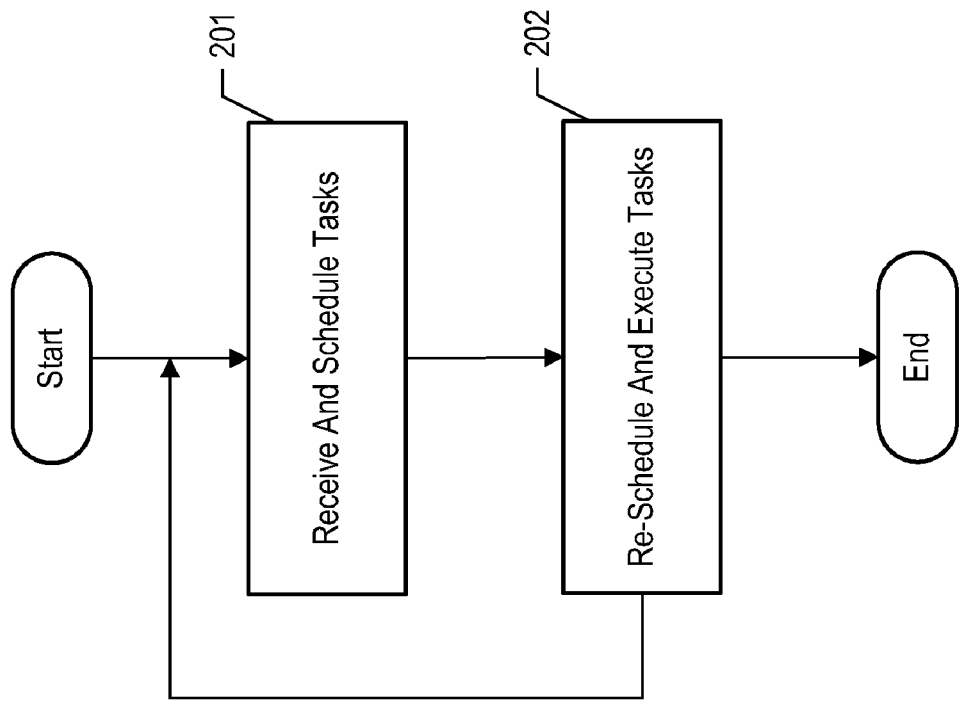
FIG. 2 depicts a flowchart of the salient steps of data-processing system 100 according to the illustrative embodiments of the present invention.

FIG. 2 depicts a flowchart of the salient steps of data-processing system 100 according to the illustrative embodiments of the present invention.

At step 201, a temporal succession of tasks, $T_1 \ldots T_i$, is received and analyzed by scheduler 102. As a result of the analysis, scheduler 102 schedules each task for execution at processor 104-1 or 104-2 and places the task into corresponding queue 103-1 or 103-2, respectively.

In accordance with the illustrative embodiments, each task $T_i$ arrives at receiver 101 with accompanying parameters. Additional parameters are established upon arrival. Accordingly, each task is accompanied by an attribute of "time-sensitive" or "non-time-sensitive" and by a priority; additionally, the time that the task enters its respective queue is recorded and becomes a parameter of the task. It will be clear to those having ordinary skill in the art, after reading the present disclosure, how to make and use alternative embodiments that use only some of the parameters described herein, or that use other parameters than those described herein.

As noted, some tasks are time-sensitive in accordance with the function they perform in data-processing system 100. For example, speech-processing tasks are time-sensitive tasks. Tasks generally known in the art as "soft real-time" tasks are time-sensitive tasks. Tasks that perform general computing typically are non-time-sensitive tasks. Whether a task is time-sensitive or non-time-sensitive is material to the present invention, as described in more detail below.

In some embodiments of the present invention, whether a task is treated as a time-sensitive task depends on whether it arrives from a time-sensitive or a non-time-sensitive "domain." For purposes of this specification, a "domain" is defined as software that is (i) an operating system or (ii) an application using the operating system, and that comprises tasks to be executed by a processor. Because multiple domains can co-exist in data-processing system 100 and each domain requires execution of its tasks on processor 104-1 or 104-2, whether a domain is time-sensitive affects the treatment of its constituent tasks. Thus, any task from a time-sensitive domain would be characterized as a time-sensitive task and treated accordingly by scheduler 102. A voice-processing application is an example of a time-sensitive domain, and therefore any task from the voice-processing application would be treated as a time-sensitive task by scheduler 102. It will be clear to those having ordinary skill in the art, after reading the present disclosure, how to make and use alternative embodiments of the present invention that use domains.

In prior art hypervisors, tasks have a priority attribute that governs at least in part where the task is placed within a queue. Typically, prior art credit schedulers queue an incoming task or some other scheduler-related event at the end of the list of tasks that have the same priority, because credit scheduler queues have a region in the queue for each priority level. The priority levels and their relative meanings are specific to the scheduler platform being used by the implementers. For the XEN credit scheduler, for example, tasks have "boost priority," "under priority," "over priority," or "idle priority" in decreasing priority value. Thus, a task with "boost priority" is of a higher priority than a task with "under priority." Each of these priority levels has its own region within the queue that the XEN credit scheduler manages. In the preferred embodiments of the present invention, task priority levels are the same as in the XEN credit scheduler. Queuing of incoming tasks to the appropriate priority region of the queue is generally the same in the preferred embodiments as in the XEN credit scheduler, except as disclosed otherwise herein.

In accordance with some illustrative embodiments, when a task enters a queue, the time that it enters the queue is recorded and becomes associated with the task. Thus, the time that a task entered its respective queue becomes a parameter of the task. It will be clear to those having ordinary skill in the art, after reading the present disclosure, how to make and use alternative embodiments of the present invention in which the queue entry time is not recorded and does not become a parameter associated with a task.

In accordance with some illustrative embodiments of the present invention, a "runtime parameter," $\rho_i$, is associated with each task $T_i$, and represents an expected time of execution of the respective task in the upcoming execution cycle. In some illustrative embodiments of the present invention, the runtime parameter is the execution time of the task in the immediately preceding execution cycle. It will be clear to those having ordinary skill in the art, after reading the present disclosure, how to make and use alternative embodiments in which the runtime parameter is based on an average of execution times from a plurality of previous execution cycles. It will be further clear to those having ordinary skill in the art, after reading the present disclosure, how to make and use alternative embodiments in which the runtime parameter is based on other considerations.

Step 201 is described in greater detail below and in the accompanying figures.

At step 202, scheduler 102 analyzes queues 103-1 and 103-2 and processors 104-1 and 104-2. Based on criteria, scheduler 102 may re-schedule a task that is presently at the head of either queue 103-1 or 103-2 to be executed before another task that is at the head of the other queue. As noted, each processor in the illustrative embodiments executes the task at the head of the processor's corresponding queue, so that when scheduler 102 re-schedules a task from a first queue to a second queue, that task will be executed sooner than another task that is presently at the head of the first queue. This process is colloquially referred to as "stealing." It should be noted that a waiting task at the head of a queue can still have a long waiting time, because the corresponding processor must first finish its current task before executing the waiting task. Therefore, stealing (or re-scheduling) the waiting task to be executed on another processor can speed up the task's overall performance. Step 202 and the criteria that govern re-scheduling of tasks are described in greater detail below and in the accompanying figures.

It will be clear to those having ordinary skill in the art, after reading the present disclosure, how to make and use the steps associated with data-processing system 100. It will be clear to those having ordinary skill in the art, after reading the present disclosure, how to make and use alternative embodiments of the present invention in which steps 201 and 202 and their constituent steps are executed in a different sequence, are sub-divided into other tasks, are selectively skipped, are executed on different timing parameters, or are grouped differently; or are executed by a different component of data-processing system 100; or use different data structures than described herein.

Figure 3A:
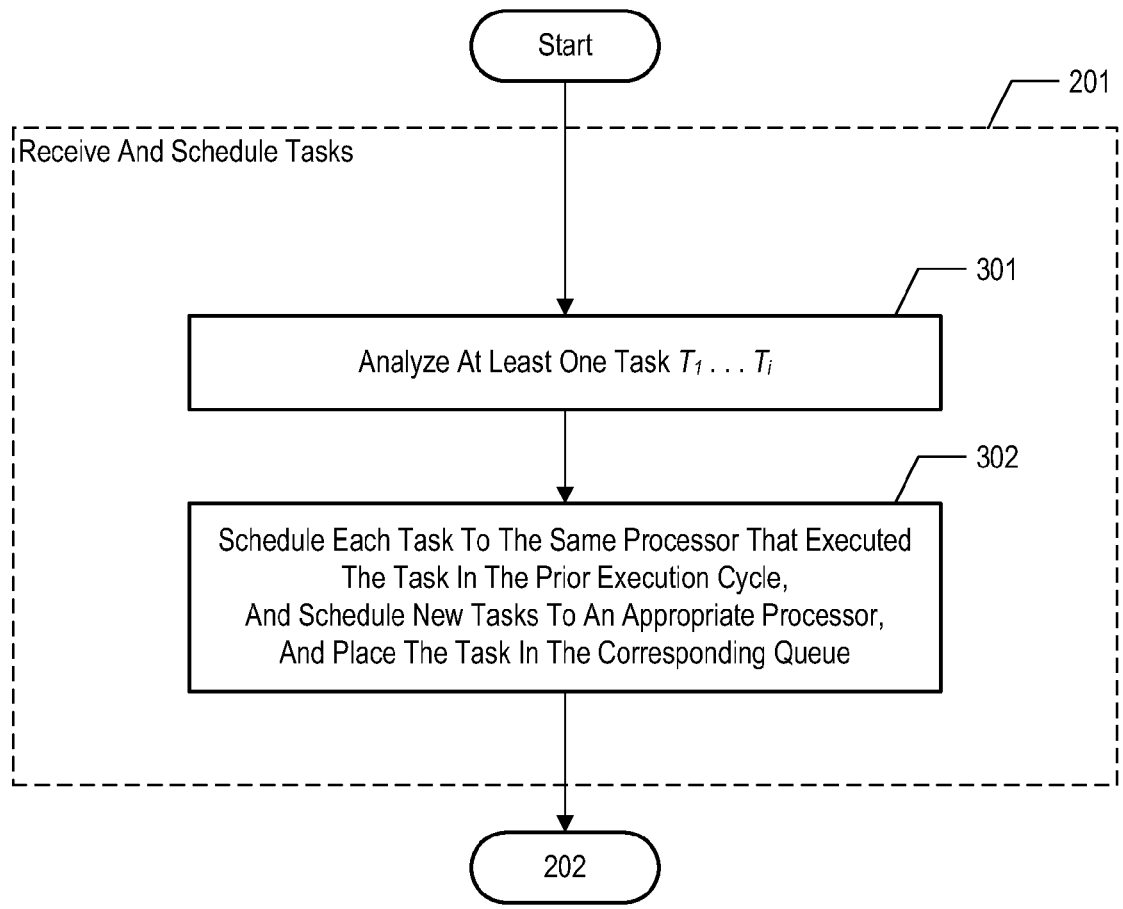
FIG. 3A depicts a flowchart of the salient steps associated with the performance of step 201 according to a first illustrative embodiment of the present invention.

FIG. 3A depicts a flowchart of the salient steps associated with the performance of step 201 according to a first illustrative embodiment of the present invention. As noted, in general, the methods according to the illustrative embodiments are triggered when a scheduler-related event happens in data-processing system 100, i.e., an event occurs that requires scheduler 102 to act.

At step 301, upon the occurrence of a scheduler-related event, if receiver 101 receives at least one task in a temporal sequence, it triggers scheduler 102 to analyze the received tasks. The scheduler-related event in accordance with the first illustrative embodiment is any of: the arrival of a new task, the occurrence of an input/output ("I/O") event for an existing task, a task relinquishing a processor, a processor becoming idle and available to execute another task, or a timer trigger. In the first illustrative embodiment, a default 30-millisecond timer acts as a trigger, but it will be clear to those having ordinary skill in the art, after reading the present disclosure, how to make alternative embodiments with different timers. It will be clear to those having ordinary skill in the art, after reading the present disclosure, how to make and use step 301.

At step 302, scheduler 102 schedules each received task to the same processor that previously executed it in the preceding execution cycle. The task is queued to the queue that corresponds to the chosen processor. This policy reduces cache thrashing by permitting a processor to re-use a cache for a task that it previously executed. This policy is sometimes referred to herein as "cache affinity." In the case of a new task's arrival, i.e., a task not previously executed or not executed in the previous execution cycle, scheduler 102 schedules the task to an appropriate processor, which is processor 104-1 in the illustrative embodiment. It will be clear to those having ordinary skill in the art, after reading the present disclosure, how to make and use alternative embodiments in which tasks are scheduled based on other considerations or other cache policies.

Figure 3B:
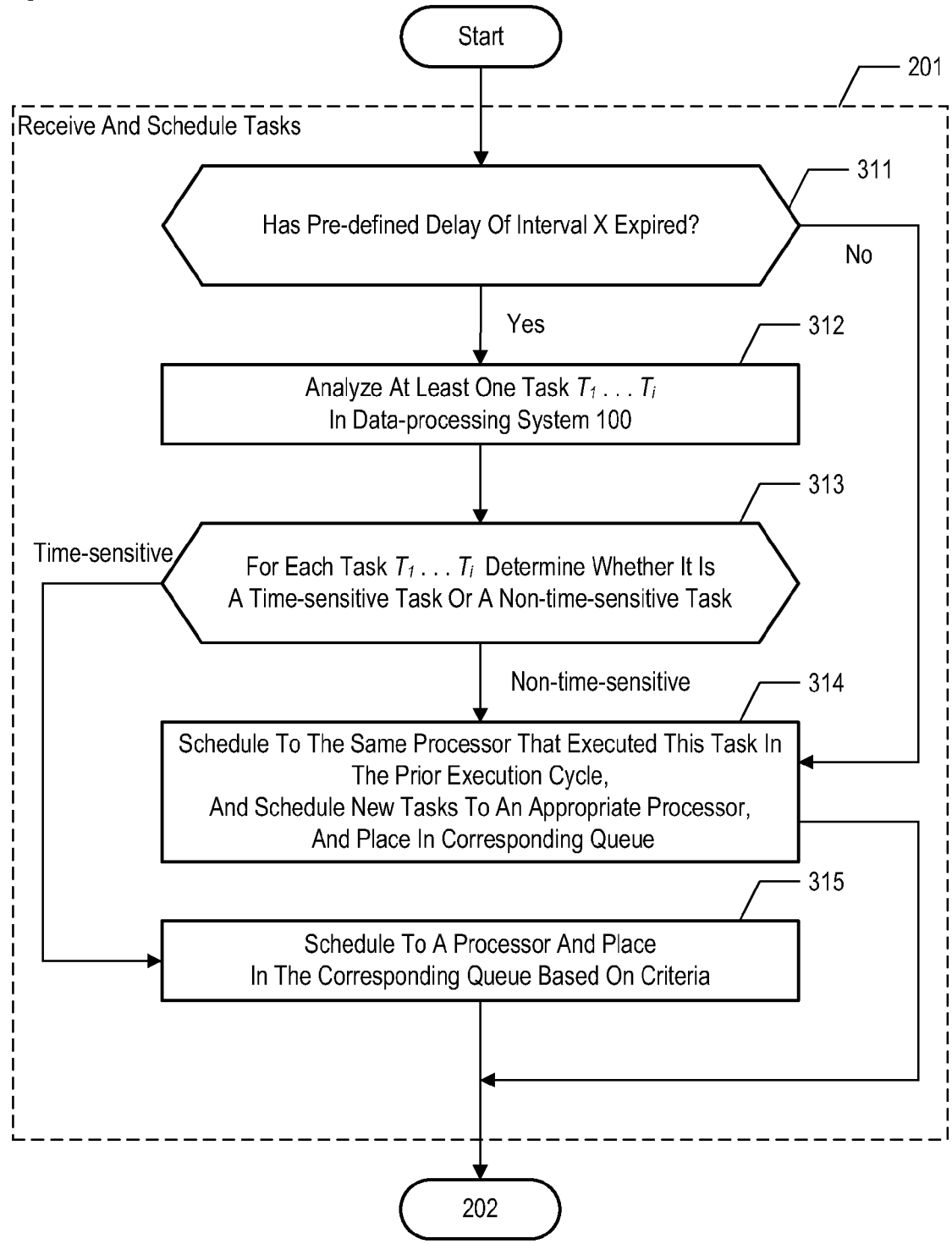
FIG. 3B depicts a flowchart of the salient steps associated with the performance of step 201 according to a second illustrative embodiment.

FIG. 3B depicts a flowchart of the salient steps associated with the performance of step 201 according to a second illustrative embodiment. As noted, in general, the methods according to the illustrative embodiments are triggered when a scheduler-related event happens in data-processing system 100, i.e., an event requiring scheduler 102 to act.

Step 311 represents a timer that triggers scheduler 102 to act in accordance with the second illustrative embodiment, and the timer is referred to herein as "interval X." Interval X represents the frequency of execution of some of the constituent steps in step 201—as disclosed in more detail below and in the accompanying figures. Interval X in the illustrative embodiment is one second, but it will be clear to those having ordinary skill in the art, after reading the present disclosure, how to make and use alternative embodiments of the present invention in which interval X is of a different duration, or in which interval X varies based on other considerations of the implementers. It should be noted that interval X is independent of the duration of the execution cycle referred to elsewhere in this disclosure.

At step 311, if interval X has not expired, default scheduling control flows to step 314. When interval X expires, control flows to step 312.

At step 312, upon the trigger of interval X, scheduler 102 acts with respect to the tasks in data-processing system 100, by analyzing the waiting tasks in all queues. It will be clear to those having ordinary skill in the art, after reading the present disclosure, how to make and use step 312.

At step 313, scheduler 102 determines whether each task is a time-sensitive task or a non-time-sensitive task. For time-sensitive tasks, control flows to step 315. For non-time-sensitive tasks, control flows to step 314.

Step 314 is analogous to step 302 described above. At step 314, a task is scheduled to the same processor that executed this task in the previous execution cycle. In the case of a new task's arrival, i.e., a task not previously executed or not executed in the previous execution cycle, scheduler 102 schedules the task to an appropriate processor, which is processor 104-1 in the illustrative embodiment. The task is queued to the queue that corresponds to the chosen processor. It will be clear to those having ordinary skill in the art, after reading the present disclosure, how to make and use alternative embodiments of the present invention in which tasks are scheduled differently.

At step 315, scheduler 102 schedules each time-sensitive task to one of the processors in data-processing system 100 and places the task in the queue that corresponds to that processor, based on criteria. Step 315 is described in more detail below and in the accompanying figures.

Figure 4:
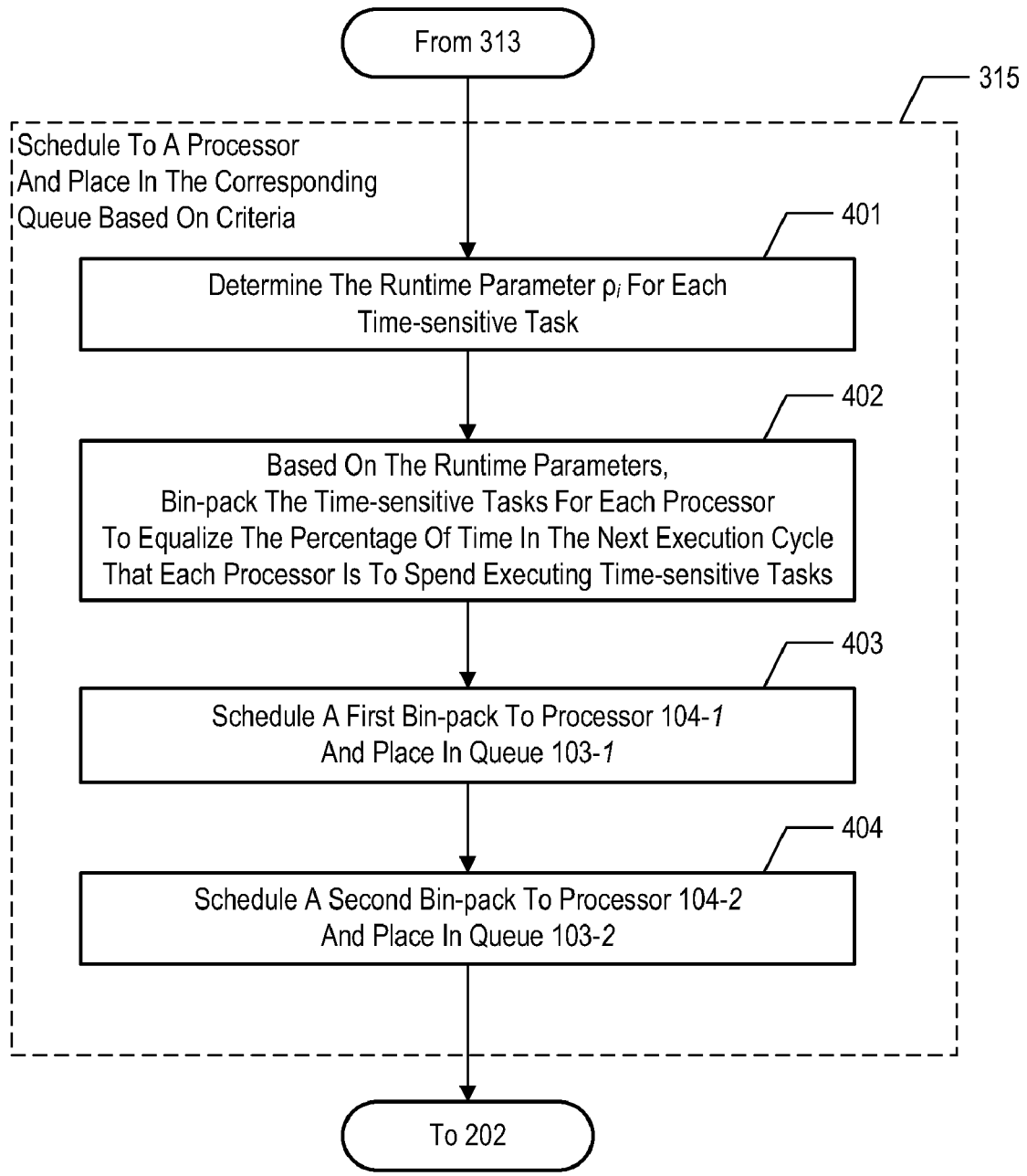
FIG. 4 depicts a flowchart of the salient steps associated with the performance of step 315.

FIG. 4 depicts a flowchart of the salient steps associated with the performance of step 315.

At step 401, for each of the time-sensitive tasks under analysis by scheduler 102, $T_1 \ldots T_i$, scheduler 102 determines the runtime parameter $\rho_i$ that is associated with task $T_i$. In the illustrative embodiment, $\rho_i$ accompanies each task when it arrives, but it will be clear to those skilled in the art, after reading the present disclosure, how to make and use alternative embodiments in another manner of the implementers' choosing. For example, $\rho_i$ can be calculated upon the arrival of each task, or $\rho_i$ can be re-calculated based on other considerations. It will be clear to those having ordinary skill in the art, after reading the present disclosure, how to implement step 401.

At step 402, scheduler 102 bin-packs the time-sensitive tasks in data-processing system 100. Bin-packing techniques are well-known in the art. See, e.g., Joseph Malkevitch, Bin Packing and Machine Scheduling, Feature Column Archive, American Mathematical Society, https://www.ams.org/samplings/feature-column/fcarc-packings1 (last visited Apr. 13, 2010). In regards to the particular problem of multi-processor scheduling, one way of phrasing the multi-processor scheduling problem in terms of bin-packing concepts is: "'Given a set J of jobs where job $j_i$ has length $l_i$ and a number of processors $m_i$, what is the minimum possible time required to schedule all jobs in J on m processors such that none overlap?'" Wikipedia online, Multiprocessor Scheduling, http://en.wikipedia.org/wiki/Multiprocessor scheduling (last visited Apr. 15, 2010).

In the illustrative embodiment, the bin-packing is directed at minimizing the difference in expected utilization among processors for executing the time-sensitive tasks in data-processing system 100, i.e., load-balancing the processing of time-sensitive tasks. Thus, the bin-packing in accordance with the illustrative embodiment aims to equalize the percentage of time in the next execution cycle that each processor in data-processing system 100 is to spend executing time-sensitive tasks. For purposes of this disclosure, the percentage of time in the next execution cycle that a processor, j, is to spend executing time-sensitive tasks in an execution cycle is defined as "$\mu_j$," wherein j is an integer.

In accordance with the illustrative embodiment, data-processing system 100 comprises two processors: processor 104-1 and processor 104-2; therefore the bin-packing in step 402 is directed at creating at least one bin-pack for each of the two processors. Thus, in some embodiments, $\mu_1$ for processor 104-1 is the sum of the runtime parameters of the tasks in a first bin-pack, taken as a percentage of the total processing capacity of processor 104-1. Likewise, in some embodiments, $\mu_2$ for processor 104-2 is the sum of the runtime parameters of the tasks in a second bin-pack, taken as a percentage of the total processing capacity of processor 104-2.

It will be clear to those having ordinary skill in the art, after reading the present disclosure, how to make and use alternative embodiments in which the bin-packing is directed at other considerations, such as minimizing the number of processors in data-processing system 100 that are to be used for processing time-sensitive tasks, or minimizing the expected execution time of the tasks in each bin-pack, or a combination of considerations, or other considerations.

Although the illustrative embodiment uses bin-packing to group together time-sensitive tasks, it will be clear to those having ordinary skill in the art, after reading the present disclosure, how to make and use alternative embodiments in which tasks are grouped together other than by bin-packing, or are not grouped together at all and are treated instead one by one in accordance with the disclosures herein.

At step 403, a first bin-pack that was created at step 402 is scheduled to be executed by processor 104-1. The tasks in the first bin-pack are placed into the corresponding queue, i.e., queue 103-1.

At step 404, a second bin-pack that was created at step 402 is scheduled to be executed by processor 104-2. The tasks in the second bin-pack are placed into the corresponding queue, i.e., queue 103-2.

Although the illustrative embodiment does not bin-pack the non-time-sensitive tasks (see step 314), it will be clear to those having ordinary skill in the art, after reading the present disclosure, how to make and use alternative embodiments in which non-time-sensitive tasks are bin-packed. It will be further clear to those having ordinary skill in the art, after reading the present disclosure, how to make and use alternative embodiments in which non-time-sensitive tasks are grouped other than by bin-packing.

It should be noted that the priority attribute of a task may govern where to place a task or a bin-pack into a queue. In the illustrative embodiment, the priority of the task is independent of the execution of step 315 as described herein. However, it will be clear to those having ordinary skill in the art, after reading the present disclosure, how to make and use alternative embodiments in which the priority of a task is a factor in the bin-packing described herein.

It should be further noted that, as described below in regards to step 202, some of the tasks that are scheduled to be executed by a processor at step 201 may be re-scheduled to another processor at step 202.

Figure 5:
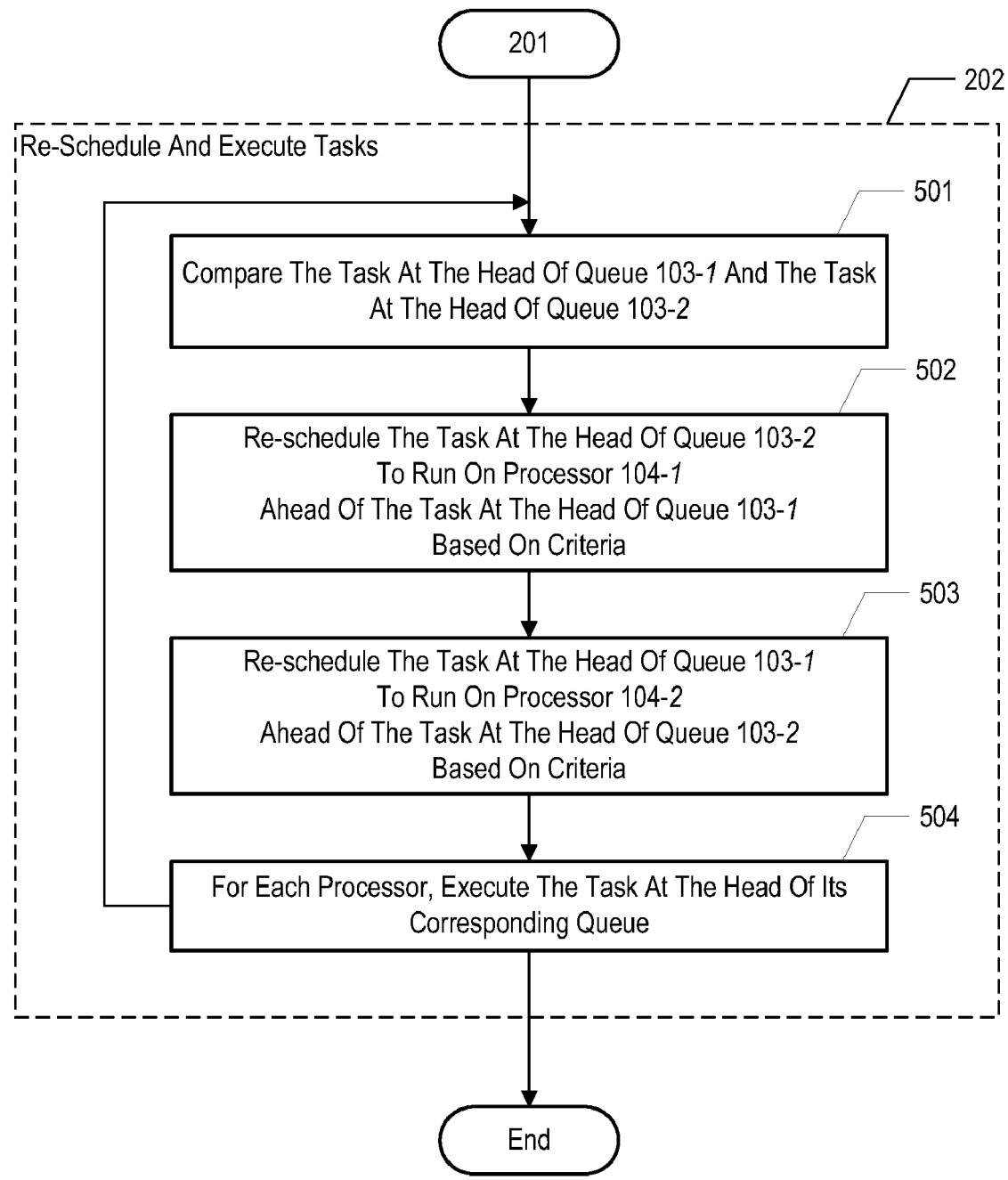
FIG. 5 depicts a flowchart of the salient steps associated with the performance of step 202.

FIG. 5 depicts a flowchart of the salient steps associated with the performance of step 202.

As noted, step 202 governs scheduler 102's analysis of tasks at the head of each queue to determine whether to re-schedule a task to another processor. By re-scheduling, scheduler 102 in effect places a task at the head of another queue. In the illustrative embodiments, the task at the head of a queue is the task that is next to be executed by the corresponding processor. It will be clear to those having ordinary skill in the art, after reading the present disclosure, that a task at the head of a queue may be part of a bin-pack that was created in step 402; whether a task is part of a bin-pack is independent of the execution of step 202.

At step 501, scheduler 102 compares the task at the head of queue 103-1 and the task at the head of queue 103-2. The order of arrival of a task is not relevant, in this context, to whether it is at the head of a queue. Step 501 is described in more detail below and in the accompanying figures.

At step 502, scheduler 102 determines whether to re-schedule the task at the head of queue 103-1 to run on processor 104-2 ahead of the task at the head of queue 103-2. Step 502 is described in more detail below and in the accompanying figures.

At step 503, scheduler 102 determines whether to re-schedule the task at the head of queue 103-2 to run on processor 104-1 ahead of the task at the head of queue 103-1. Step 503 is described in more detail below and in the accompanying figures.

At step 504, after analysis and re-scheduling, if any, at steps 502 and 503, each processor executes the task at the head of its corresponding queue. Thus, processor 104-1 executes the task at the head of queue 103-1 and processor 104-2 executes the task at the head of queue 103-2.

It will be clear to those having ordinary skill in the art, after reading the present disclosure, how to make and use alternative embodiments of the present invention in which re-scheduling does not require a re-queuing of a task from one queue to another. For example, re-scheduling in accordance with step 202 may result in immediate execution of the re-scheduled task by the chosen processor. It will be clear to those having ordinary skill in the art, after reading the present disclosure, how to make and use alternative embodiments of the present invention in which data structures other than queues are used for the scheduling and re-scheduling of tasks to be executed on a chosen processor. For example, a single pointer array may be used to manage all the tasks in data-processing system 100 without using a plurality of queues.

Figure 6:
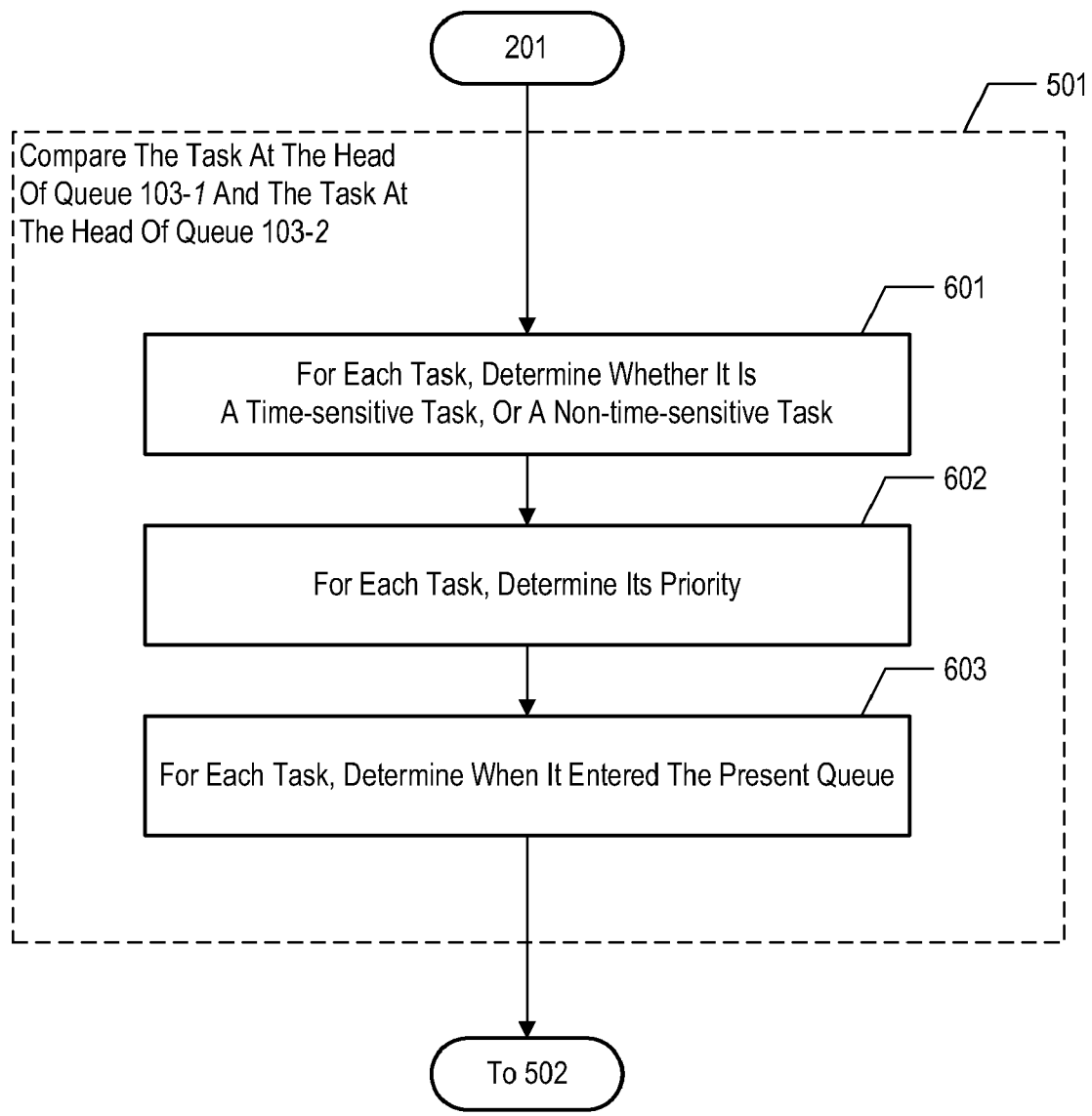
FIG. 6 depicts a flowchart of the salient steps associated with the performance of step 501.

FIG. 6 depicts a flowchart of the salient steps associated with the performance of step 501.

At step 601, for each task that it is analyzing, scheduler 102 determines whether the task is a time-sensitive task or a non-time-sensitive task. It will be clear to those having ordinary skill in the art, after reading the present disclosure, how to make and use step 601.

At step 602, for each task, scheduler 102 determines the priority of the task in a manner well-known in the art. As noted, the relative priorities of tasks depend on the hypervisor platform that is used by the implementers.

At step 603, for each task, scheduler 102 determines the time that the task entered its respective queue in a manner well-known in the art.

Figure 7A:
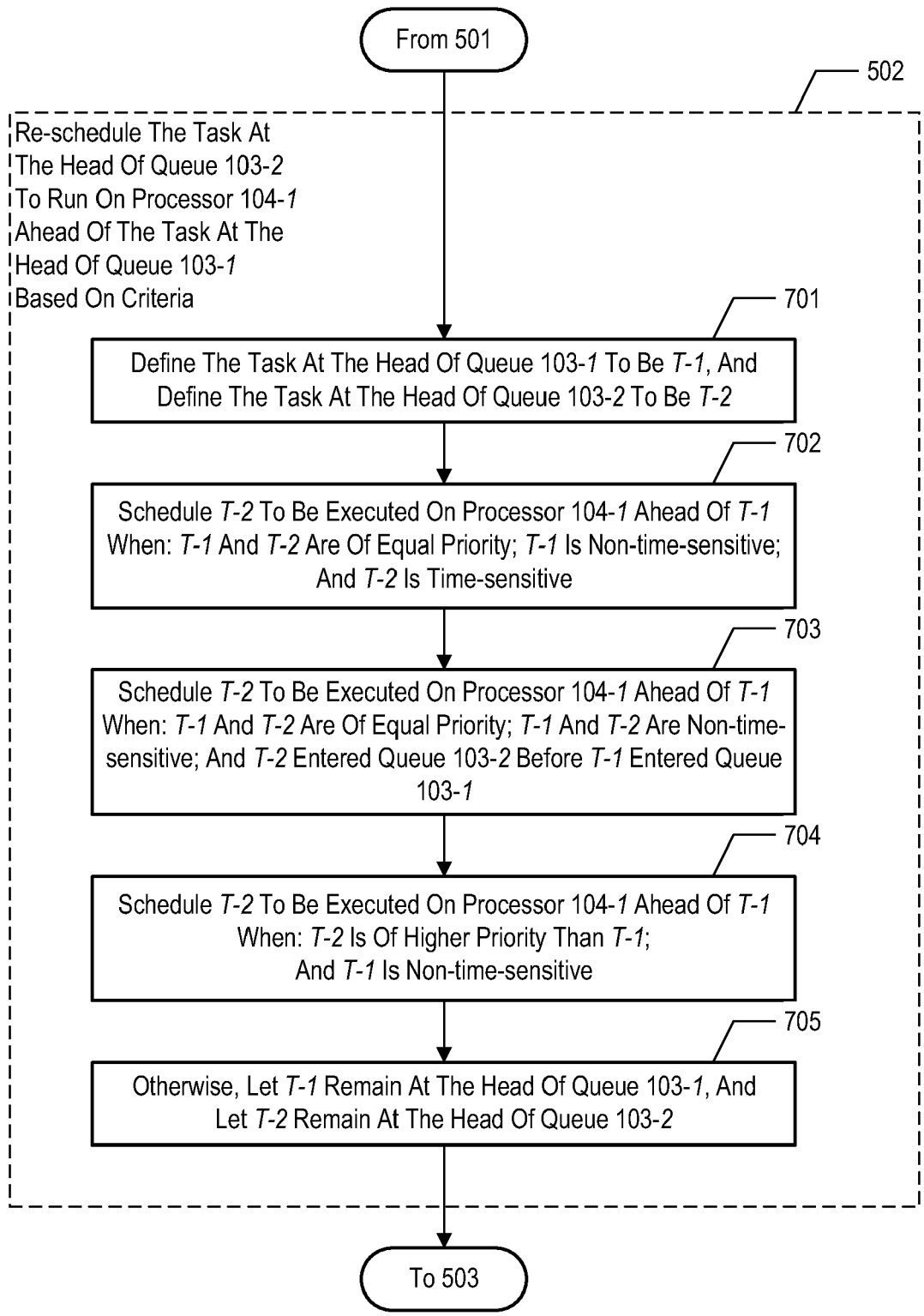
FIG. 7A depicts a flowchart of the salient steps associated with the performance of step 502 according to the first illustrative embodiment.

FIG. 7A depicts a flowchart of the salient steps associated with the performance of step 502 according to the first illustrative embodiment of the present invention.

Step 701 is depicted for the convenience of the reader of this disclosure, and it will be clear to those having ordinary skill in the art, after reading the present disclosure, how to make and use alternative embodiments that do not comprise step 701. In step 701, the task at the head of queue 103-1 is defined as T-1, and the task at the head of queue 103-2 is defined as T-2.

At step 702, scheduler 102 re-schedules T-2 by scheduling T-2 to be executed on processor 104-1 ahead of T-1 when: (i) T-1 and T-2 are of equal priority, (ii) T-1 is a non-time-sensitive task, and (iii) T-2 is a time-sensitive task.

At step 703, scheduler 102 re-schedules T-2 by scheduling T-2 to be executed on processor 104-1 ahead of T-1 when: (i) T-1 and T-2 are of equal priority, (ii) T-1 and T-2 are non-time-sensitive tasks, and (iii) T-2 entered queue 103-2 before T-1 entered queue 103-1, i.e., T-2 has been queued longer than T-1.

At step 704, scheduler 102 re-schedules T-2 by scheduling T-2 to be executed on processor 104-1 ahead of T-1 when: (i) T-2 is of higher priority than T-1, and (ii) T-1 is a non-time-sensitive task.

At step 705, absent the conditions set forth above, scheduler 102 does not re-schedule T-2 and instead leaves T-1 at the head of queue 103-1 and leaves T-2 at the head of queue 103-2.

Figure 7B:
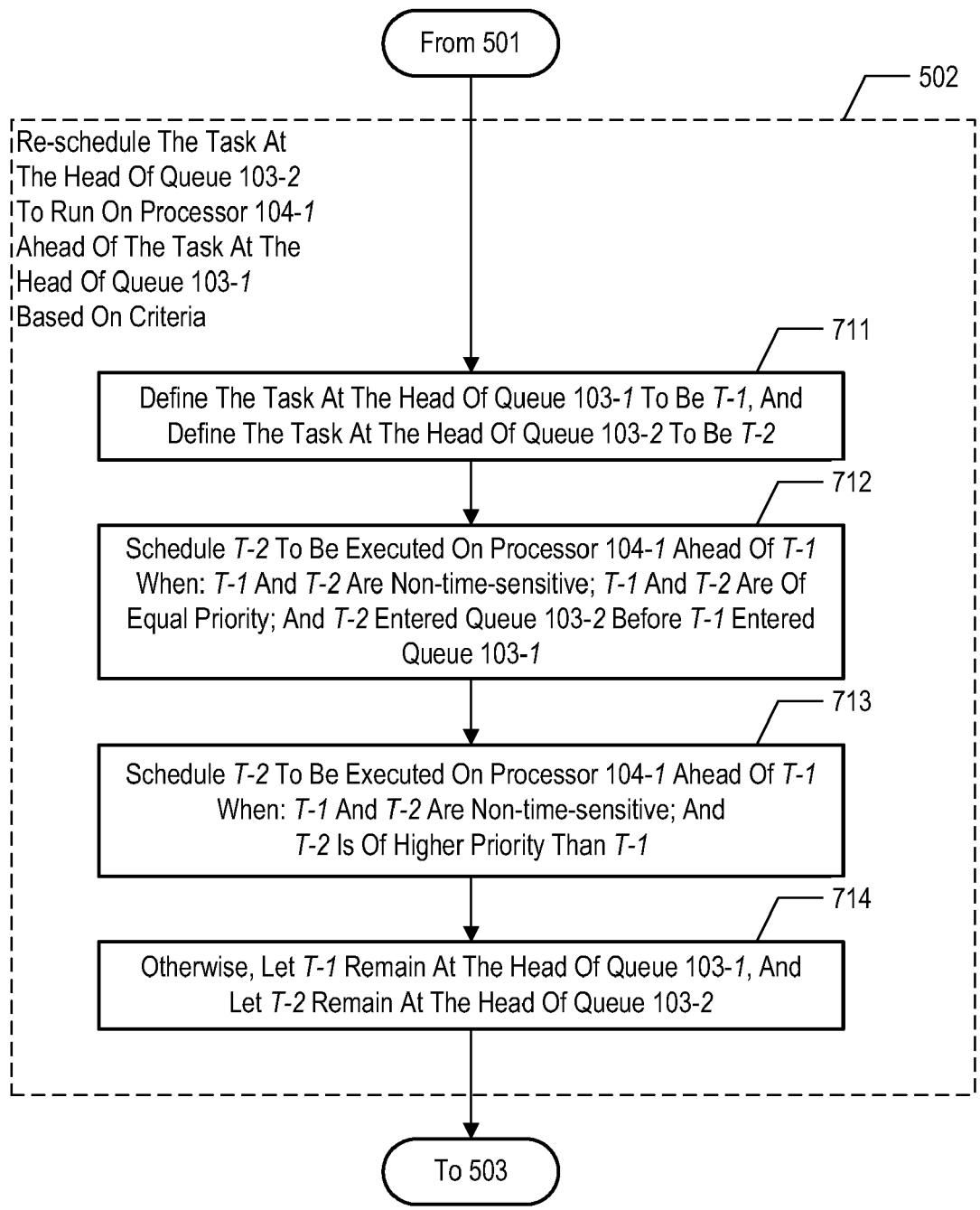
FIG. 7B depicts a flowchart of the salient steps associated with the performance of step 502 according to the second illustrative embodiment.

FIG. 7B depicts a flowchart of the salient steps associated with the performance of step 502 according to the second illustrative embodiment.

Step 711 is depicted for the convenience of the reader of this disclosure, and it will be clear to those having ordinary skill in the art, after reading the present disclosure, how to make and use alternative embodiments that do not comprise step 711. In step 711, the task at the head of queue 103-1 is defined as T-1, and the task at the head of queue 103-2 is defined as T-2.

At step 712, scheduler 102 re-schedules T-2 by scheduling T-2 to be executed on processor 104-1 ahead of T-1 when: (i) T-1 and T-2 are non-time-sensitive tasks, (ii) T-1 and T-2 are of equal priority, and (iii) T-2 entered queue 103-2 before T-1 entered queue 103-1, i.e., T-2 has been queued longer than T-1.

At step 713, scheduler 102 re-schedules T-2 by scheduling T-2 to be executed on processor 104-1 ahead of T-1 when: (i) T-1 and T-2 are non-time-sensitive tasks, and (ii) T-2 is of higher priority than T-1.

At step 714, absent the conditions set forth above, scheduler 102 does not re-schedule T-2 and instead leaves T-1 at the head of queue 103-1 and leaves T-2 at the head of queue 103-2.

Figure 8A:
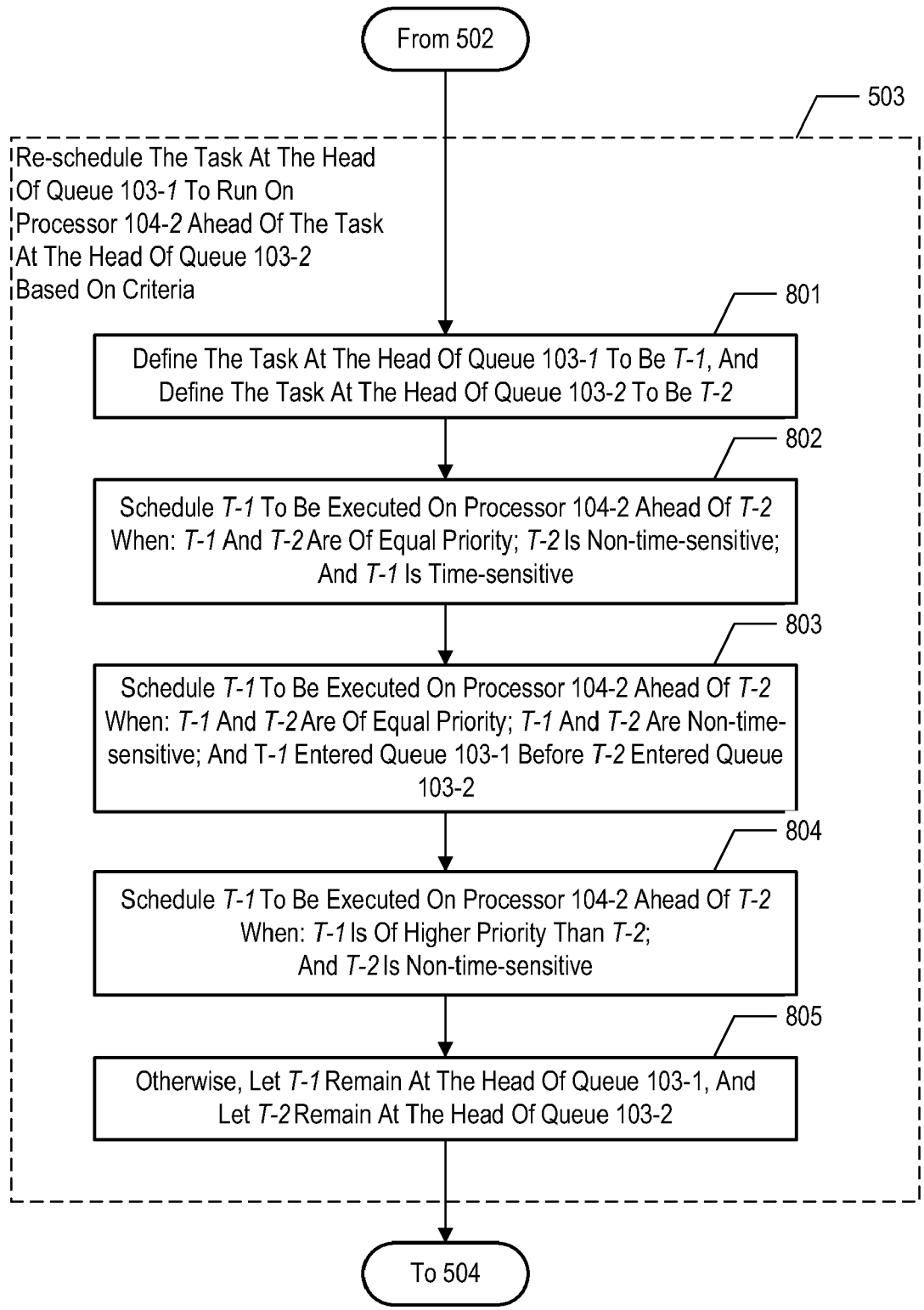
FIG. 8A depicts a flowchart of the salient steps associated with the performance of step 503 according to the first illustrative embodiment.

FIG. 8A depicts a flowchart of the salient steps associated with the performance of step 503 according to the first illustrative embodiment.

Step 801 is depicted for the convenience of the reader of this disclosure, and it will be clear to those having ordinary skill in the art, after reading the present disclosure, how to make and use alternative embodiments that do not comprise step 801. In step 801, the task at the head of queue 103-1 is defined as T-1, and the task at the head of queue 103-2 is defined as T-2.

At step 802, scheduler 102 re-schedules T-1 by scheduling T-1 to be executed on processor 104-2 ahead of T-2 when: (i) T-1 and T-2 are of equal priority, (ii) T-2 is a non-time-sensitive task, and (iii) T-1 is a time-sensitive task.

At step 803, scheduler 102 re-schedules T-1 by scheduling T-1 to be executed on processor 104-2 ahead of T-2 when: (i) T-1 and T-2 are of equal priority, (ii) T-1 and T-2 are non-time-sensitive tasks, and (iii) T-1 entered queue 103-1 before T-2 entered queue 103-2, i.e., T-1 has been queued longer than T-2.

At step 804, scheduler 102 re-schedules T-1 by scheduling T-1 to be executed on processor 104-2 ahead of T-2 when: (i) T-1 is of higher priority than T-2, and (ii) T-2 is a non-time-sensitive task.

At step 805, absent the conditions set forth above, scheduler 102 does not re-schedule T-1 and instead leaves T-1 at the head of queue 103-1 and leaves T-2 at the head of queue 103-2.

Figure 8B:
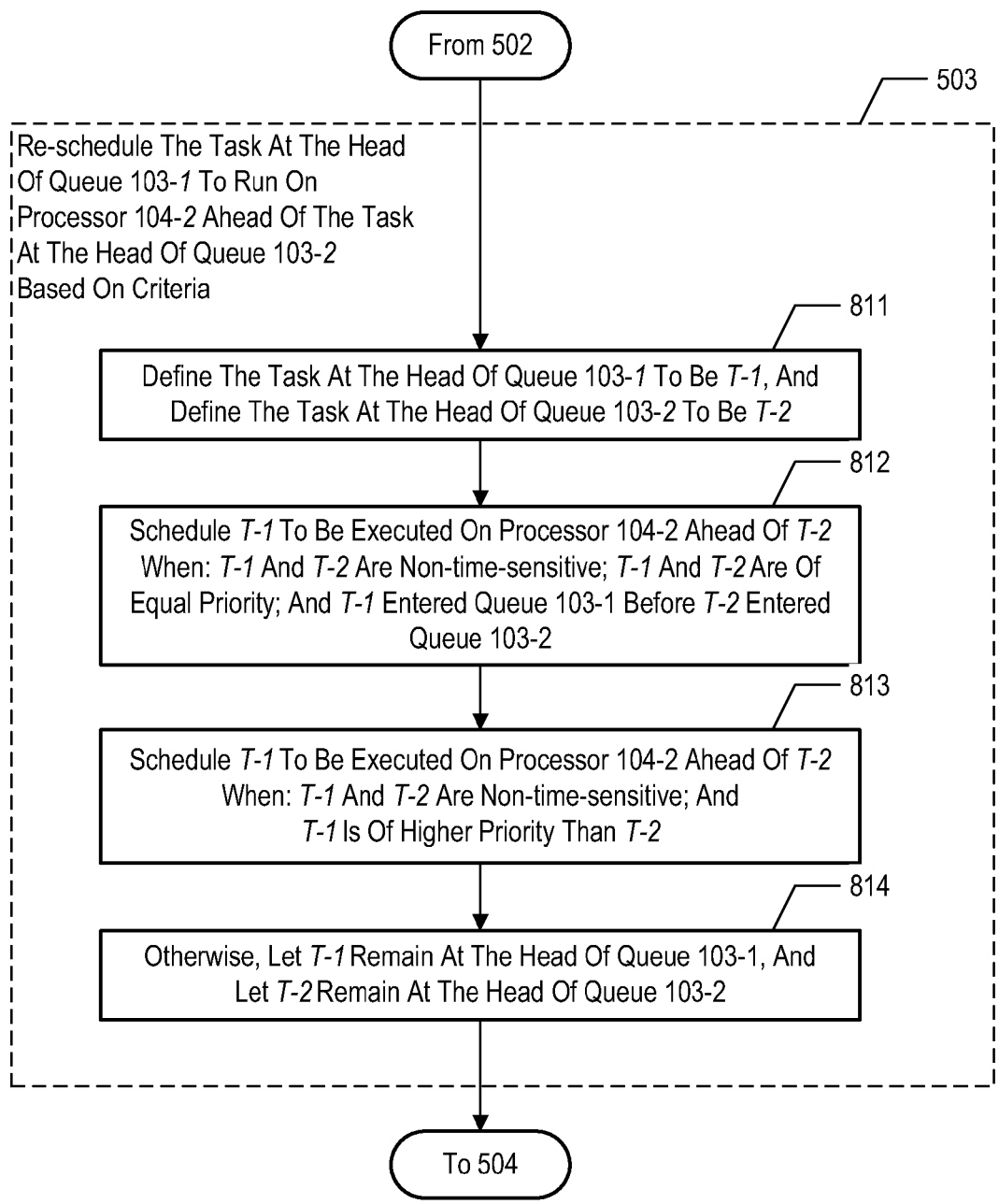
FIG. 8B depicts a flowchart of the salient steps associated with the performance of step 503 according to the second illustrative embodiment.

FIG. 8B depicts a flowchart of the salient steps associated with the performance of step 503 according to the second illustrative embodiment.

Step 811 is depicted for the convenience of the reader of this disclosure, and it will be clear to those having ordinary skill in the art, after reading the present disclosure, how to make and use alternative embodiments that do not comprise step 811. In step 811, the task at the head of queue 103-1 is defined as T-1, and the task at the head of queue 103-2 is defined as T-2.

At step 812, scheduler 102 re-schedules T-1 by scheduling T-1 to be executed on processor 104-2 ahead of T-2 when: (i) T-1 and T-2 are non-time-sensitive tasks, (ii) T-1 and T-2 are of equal priority, and (iii) T-1 entered queue 103-1 before T-2 entered queue 103-2, i.e., T-1 has been queued longer than T-2.

At step 813, scheduler 102 re-schedules T-1 by scheduling T-1 to be executed on processor 104-2 ahead of T-2 when: (i) T-1 and T-2 are non-time-sensitive tasks, and (ii) T-1 is of higher priority than T-2.

At step 814, absent the conditions set forth above, scheduler 102 does not re-schedule T-1 and instead leaves T-1 at the head of queue 103-1 and leaves T-2 at the head of queue 103-2.

It is to be understood that the disclosure teaches just two examples of the illustrative embodiments and that many variations of the invention can easily be devised by those skilled in the art after reading this disclosure and that the scope of the present invention is to be determined by the following claims.

What is claimed is:

1. A method comprising:
receiving during a first time interval by a data-processing system a plurality of tasks that are time-sensitive;
bin-packing by the data-processing system the plurality of tasks into (a) a first bin-pack to be executed on a first processor and (b) a second bin-pack to be executed on a second processor, wherein:
(i) $\mu_1$ is a percentage of time to be used by the first processor for executing tasks in the first bin-pack during a second time interval,
(ii) $\mu_2$ is a percentage of time to be used by the second processor for executing tasks in the second bin-pack during the second time interval, and
(iii) the bin-packing is based on minimizing a difference between $\mu_1$ and $\mu_2$;
executing by the first processor the tasks in the first bin-pack;
executing by the second processor the tasks in the second bin-pack;
scheduling by the data-processing system a first task that is a non-time-sensitive task to be executed on the first processor, wherein the first task is at a head of a first queue that is associated with the first processor; and
executing a second task that is a non-time-sensitive task on the first processor before the first task when:
the second task is at a head of a second queue that is associated with the second processor;
the first task and the second task are of equal priority; and
the second task entered the second queue before the first task entered the first queue,
wherein:
each time-sensitive task has a runtime parameter;
$\mu_1$ is based on a sum of the runtime parameters of the tasks in the first bin-pack; and
$\mu_2$ is based on a sum of the runtime parameters of the tasks in the second bin-pack.

2. The method of claim 1 wherein each runtime parameter is based on an execution time of an associated task during a third time interval that precedes the first time interval.

3. The method of claim 1 wherein each runtime parameter is based on an average of execution times of respective associated tasks during a plurality of time intervals that precede the first time interval.

4. The method of claim 1 wherein the bin-packing is further based on scheduling tasks to the same processor that executed them during a third time interval that precedes the first time interval.

5. The method of claim 1 further comprising:
scheduling by the data-processing system a first third task that is a non-time-sensitive task to be executed on the first processor; and
executing a second fourth task that is a non-time-sensitive task on the first processor before the first third task when the second fourth task is of higher priority than the first third task.

6. The method of claim 1 wherein the data-processing system comprises a virtualized computing environment that comprises the first processor and the second processor.

7. The method of claim 1 wherein the data-processing system comprises a credit-scheduler that determines an order of execution of the first task and of the second task.

8. The method of claim 1, further comprising:
scheduling by the data-processing system a third task to be executed on the first processor, wherein the third task is at the head of the first queue that comprises a plurality of tasks to be executed on the first processor;
scheduling by the data-processing system a fourth task to be executed on the second processor, wherein the fourth task is at the head of the second queue that comprises a plurality of tasks to be executed on the second processor; and
executing the fourth task on the first processor before the third task when:
(i) the third task and the fourth task are of equal priority, and
(ii) the third task is a non-time-sensitive task, and
(iii) the fourth task is a time-sensitive task.

9. The method of claim 1, further comprising:
scheduling the second task to be executed on the second processor, wherein the second queue comprises a plurality of tasks to be executed on the second processor.

10. The method of claim 1, further comprising:
scheduling by the data-processing system a third task to be executed on the first processor, wherein the third task is at the head of the first queue that comprises a plurality of tasks to be executed on the first processor;

scheduling by the data-processing system a fourth task to be executed on the second processor, wherein the fourth task is at the head of the second queue that comprises a plurality of tasks to be executed on the second processor; and executing the fourth task on the first processor before the third task when:
  (i) the fourth task is of higher priority than the third task, and
  (ii) the third task is a non-time-sensitive task.

11. The method of claim 10, wherein the fourth task is a time-sensitive task.

12. The method of claim 10, wherein the fourth task is a non-time-sensitive task.

13. The method of claim 10, wherein the data-processing system comprises a credit-scheduler that determines the order of execution of the third task and of the fourth task.

* * * * *